United States Patent [19]

Salihi

[11] Patent Number: 5,077,791
[45] Date of Patent: Dec. 31, 1991

[54] METHOD AND APPARATUS FOR PREVENTING UNAUTHORIZED TRANSMISSIONS

[75] Inventor: Dana J. Salihi, Fort Worth, Tex.
[73] Assignee: Motorola, Inc., Schaumburg, Ill.
[21] Appl. No.: 371,908
[22] Filed: Jun. 26, 1989
[51] Int. Cl.$^5$ .......................... H04L 9/00; H04L 9/36
[52] U.S. Cl. ...................................... 380/23; 380/29; 380/48; 380/49; 380/2
[58] Field of Search ........................ 380/21, 23, 24, 25, 380/29, 49, 50, 2, 33, 48, 39, 40

[56] References Cited

U.S. PATENT DOCUMENTS

| | | |
|---|---|---|
| 3,781,472 | 12/1973 | Goode et al. .......................... 380/2 |
| 3,886,313 | 5/1975 | Branscome et al. ................... 380/40 |
| 4,013,837 | 3/1977 | Branscome et al. ................... 380/21 |
| 4,020,285 | 4/1977 | Branscome et al. ................... 380/21 |
| 4,079,188 | 3/1978 | Kinch, Jr. et al. ..................... 380/48 |
| 4,091,423 | 5/1978 | Branscome ......................... 380/48 X |
| 4,167,700 | 9/1979 | Coe et al. ............................. 380/33 |
| 4,368,357 | 1/1983 | Gurak ..................................... 380/2 |

*Primary Examiner*—Bernarr E. Gregory
*Attorney, Agent, or Firm*—Michael J. Buchenhorner; Thomas G. Berry

[57] ABSTRACT

Each subscriber unit (108) operating on a communication system (100) selects either encrypted or unencrypted transmission mode as a current transmission mode. Before participating in a communication, each subscriber unit (108) receives a message identifying an authorized transmission mode. Only when the current transmission mode corresponds to the authorized transition mode may each subscriber unit (108) transmit so as to participate in the communication.

20 Claims, 6 Drawing Sheets

METHOD AND APPARATUS FOR PREVENTING UNAUTHORIZED TRANSMISSIONS

TECHNICAL FIELD

This invention relates generally to two-way communication systems, and more specifically to such two-way communication systems capable of supporting both encrypted or un-encrypted (clear) transmissions, and is particularly directed toward a method and apparatus for ensuring that communication takes place in the correct operational mode (i.e., encrypted or un-encrypted).

BACKGROUND

In several two-way communication systems, subscriber units are required to share limited communication resources (i.e., communication channels or time slots). To control the allocation of the limited communication resources, a resource controller receives a call request from a subscriber unit to communicate with one or more other subscriber units. A communication (call) may not commence until the resource controller transmits a communication grant code that informs the communication participants as to the appropriate communication resource designated for their use.

When a communication involves the transmission of sensitive or confidential information, subscribers generally prefer to encode or encrypt their transmissions to prevent unauthorized parties from monitoring the communications. To do this, subscribers must enter an encrypted operational mode that engages an encryption device or circuitry in the subscriber unit to encrypt (and decrypt) the transmissions. However, this added information security feature may actually frustrate and imped effective communication since the several subscriber units may select their operational mode independently of one another. That is, a subscriber initiating a communication will not know whether the called subscriber units are operating in a compatible operational mode so as to be able to participate in the communication.

Another problem with limited resource communication systems arises when a requesting subscriber unit may have to wait to access to a communication resource. During this time, the subscriber unit may change its operational mode, or be called to participate in another communication so as to be unable to participate in the communication originally requested. Finally, when there are multiple operational modes on a communication system, there is a risk that a subscriber will change operational modes in mid-communication, which may compromise confidential or proprietary information due to an erroneous transmission. Accordingly, a need exists for a method for preventing undesired or erroneous transmission, while providing the added security of encrypted (or encoded) transmissions.

SUMMARY OF THE INVENTION

Accordingly, it is an object of the present invention to provide a two-way communication system that overcomes the detriments of the prior art.

Briefly, according to the invention, each subscriber unit operating on a communication system selects either a coded or uncoded transmission mode as a current transmission mode. Before participating in a communication, each subscriber unit receives a message identifying a authorized transmission mode. Only when the current transmission mode corresponds to the authorized transmission mode may each subscriber unit transmit so as to participate in the communication.

DETAILED DESCRIPTION OF THE PREFERRED EMBODIMENT

Figure 1:
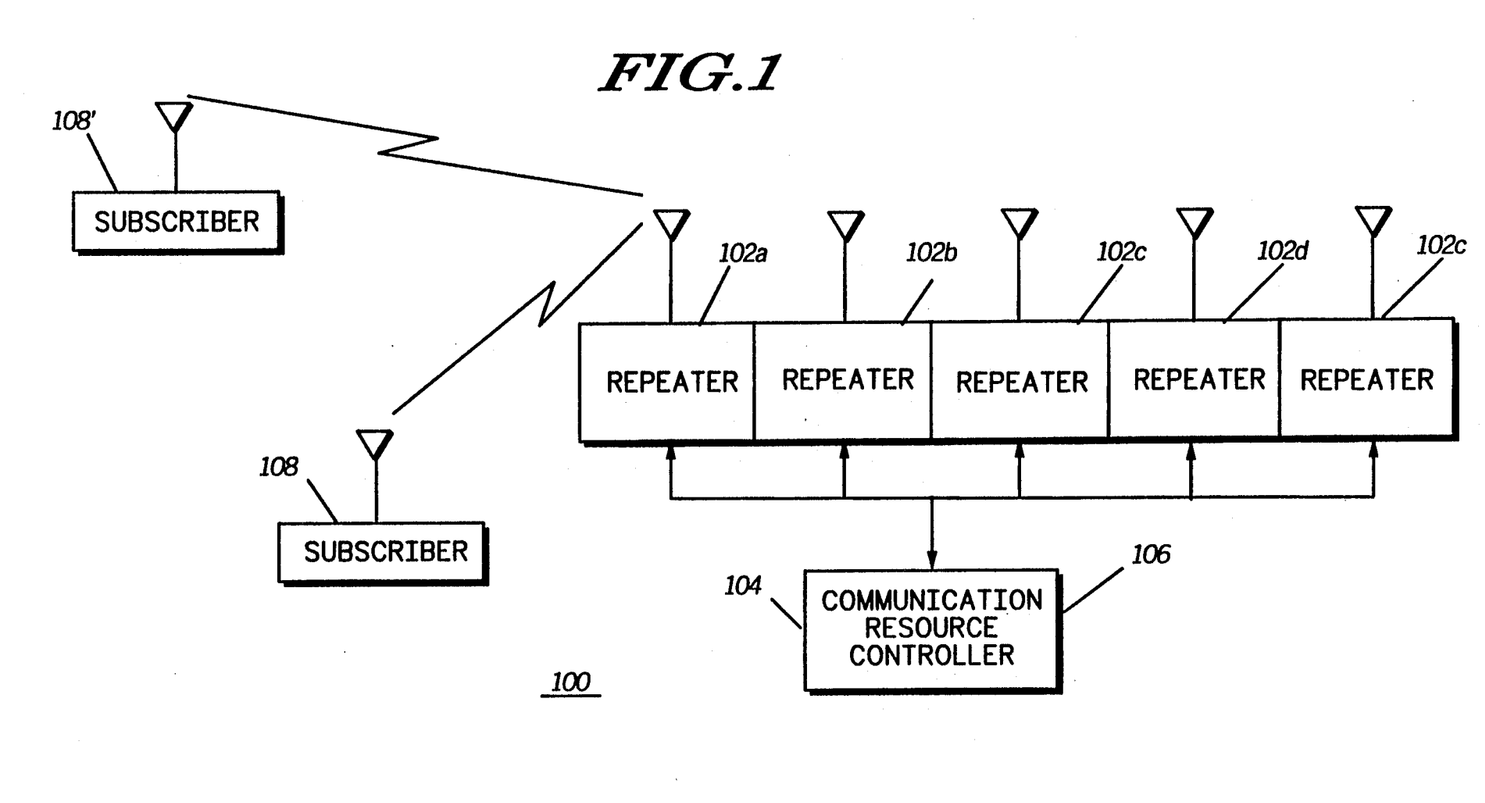
FIG. 1 is a block diagram of a two-way communication system in accordance with the present invention.

Referring to FIG. 1, there is shown a block diagram of the communication system 100 in accordance with the present invention. The communication system 100 includes a centralized set of channel resources 102a–102e that are controlled (106) by a communication resource controller 104. A plurality of subscriber units 108 (2 shown) share access to the channel resources 102a–102e by requesting access from the communication resource controller 104. According to the invention, the communication system 100 is capable of supporting both encoded (or encrypted) or "clear" (i.e., not coded or unencrypted) communications. Accordingly, at least some of the several subscriber units may select either a coded or uncoded operational mode, which affects the types of transmissions it can make and the type of communications in which it is able to participate. Accordingly, each subscriber unit capable of communicating in both modes has a selection switch (or equivalent) 235 (shown in FIG. 2) that enables the subscriber to select either the coded or uncoded operational mode.

To initiate a communication, a requesting subscriber unit 108' transmits a signal representing a call request to the communication resource controller 104. According to the invention, the subscriber unit 108' examines the state of the coded/uncoded selection switch and transmits an appropriate call request to the resource controller 104 so as to request either a coded or uncoded communication resource in accordance with the current operational mode of the subscriber unit. That is, the subscriber unit 108' automatically transmits a coded call request signal if the current operational mode of the subscriber unit 108' is set for coded transmissions. Conversely, an uncoded (or clear) call request is transmitted if the current operational mode of the subscriber unit 108' is for clear transmissions.

The resource controller 104 determines whether and which communication resource to allocate to the requesting subscriber unit 108' and one or more other subscriber units (i.e., the called subscriber units) 108 depending upon the communication resources then available for use. Accordingly, if several secure communications are already in progress, and a secure communication call request is received, the request may be temporarily denied by the resource controller 104 in favor of retaining some communication resources for uncoded traffic. However, if communication resources are available, the communication resource controller will generally transmit a communication grant to the requesting subscriber unit 108' and the called subscriber units 108, provided, however, that each of the called subscriber units is capable of operating in a corresponding operational mode. That is, the communication resource controller 104 has a record of each subscriber unit's operating capability within the system in the form of information identifying each subscriber unit as either a clear mode only, coded mode only, or clear/code mode subscriber.

When the communication resource controller 104 receives a call request, it may determine that one or more of the called subscriber units is not capable of operating in the requested operational mode of the requesting subscriber unit. In this case, the communication request will be denied. Only when the called subscriber units are capable of operating in the communication mode requested by the requesting subscriber unit will the communication be permitted within the communication system 100. Thus, the present invention prohibits erroneous transmissions during the call initiating mode.

When a subscriber unit receives a communication grant, each dual mode (clear/coded) subscriber unit examines its current operational mode, and the authorized transmission mode contained in the communication grant code. If the communication grant and the current operational mode do not match, the subscriber unit is prevented from transmitting so as to prevent an erroneous transmission. However, each subscriber unit automatically adapts its receiver to operate in a mode corresponding to the authorized communication mode so as to be able to monitor the call. Preferably, a warning tone light or enunciator is sounded so as to inform the subscriber why transmissions are being prohibited. In this way, the subscriber may only transmit if the operational mode is manually changed. Optionally, the subscriber unit may automatically re-request a communication resource in the current operational mode in an attempt to reestablish communication.

To more completely prevent unauthorized transmissions, the present invention contemplates a continual monitoring of the current operational mode by the subscriber unit while it is participating in a communication. Should a subscriber accidentally (or deliberately) change the operational mode after a communication is established, the subscriber unit will automatically prevent further transmissions while presenting an error or "wrong mode" signal to the operator. In this way, erroneous transmissions are guarded in a call maintenance procedure to insure that sensitive business data or classified proprietary information is not erroneously transmitted in an uncoded mode when a clear mode has been erroneously selected for such information.

Figure 2:
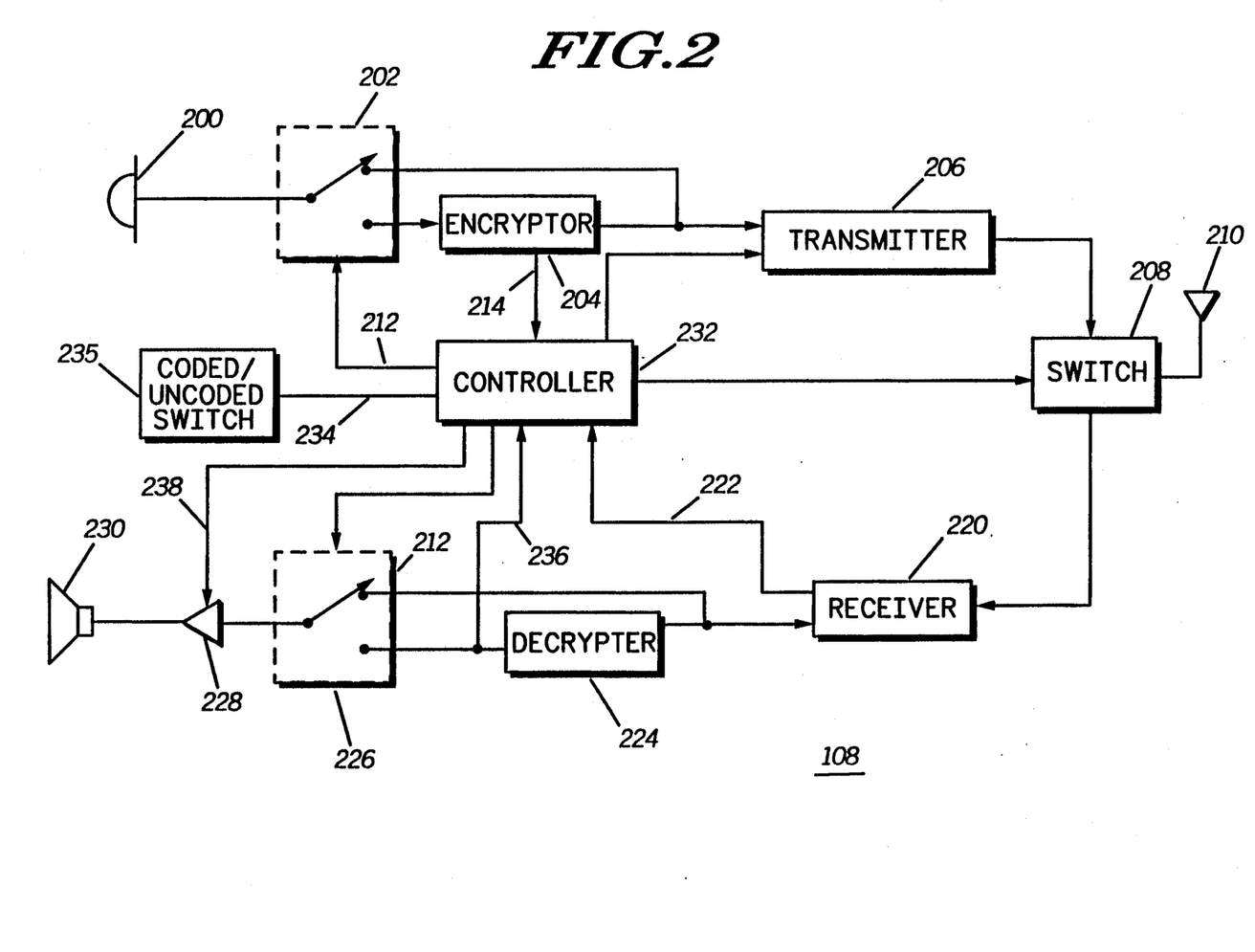
FIG. 2 is a block diagram of a subscriber unit of FIG. 1.

Referring to FIG. 2, a block diagram of subscriber unit 108 in accordance with the present invention is shown. According to the invention, a voice signal impressed on a microphone 200 may be selectively routed by a switch 202 to a coder (or encryption device) 204. The coder 204 may be any proprietary type of scrambler (or encryptor), or may follow an encryption standard, such as the data encryption standard (DES) promulgated by the National Bureau of Standards. Alternately, a subscriber controller 232 may control (212) the switch 202 to route the information from the microphone 200 directly to the transmitter 206 for an uncoded transmission. In any event, the transmitter 206 is selectively coupled via an antenna switch 208 to an antenna 210 where the coded or uncoded signal is transmitted. Signalling information, such as call request signals and other data information, can be transmitted in the clear operational mode via the controller 232 and the clear data line 218. Optionally, this information can be coded via the coder 204 accepting data from the controller 232 via the data line 214. In this way, both coded and uncoded voice and data transmissions comprise the information signals transmitted via the subscriber unit 108 of the present invention.

To receive a signal, the controller 232 instructs (216) the antenna switch 208 to couple the antenna 210 to a receiver 220. The receiver 220 provides uncoded data to the controller 232 via the clear data line 222. Coded data and clear or coded voice signals are provided to a switch 226 and to a decoder 224. The decoder 226 provides the decoded data to the controller 232 via the data line 236, while decoded voice is selectively (226) provided to an amplifier 228 that, when activated (238), provides decoded voice signals to the operator via a speaker 230. Of course, for uncoded voice transmissions, the decoder 224 is bypassed via controlling (212') the switch 226 to route the voice signals directly to the amplifier 228. The state of the switch 202 is controlled (212) by the controller 232 in accordance with the state (determined via signal 234) of the coded, uncoded switch 235. Conversely, the state of the switch 226 is controlled (212') in response to channel grant code so as to operate in the authorized communication mode, which enables the subscriber unit to monitor the call. To transmit, however, the state of the clear/coded switch must be set such that the subscriber unit's current operational mode corresponds to the authorized communication mode. In this way, the subscriber unit 108 may operate within the communication system 100.

Figure 3A:
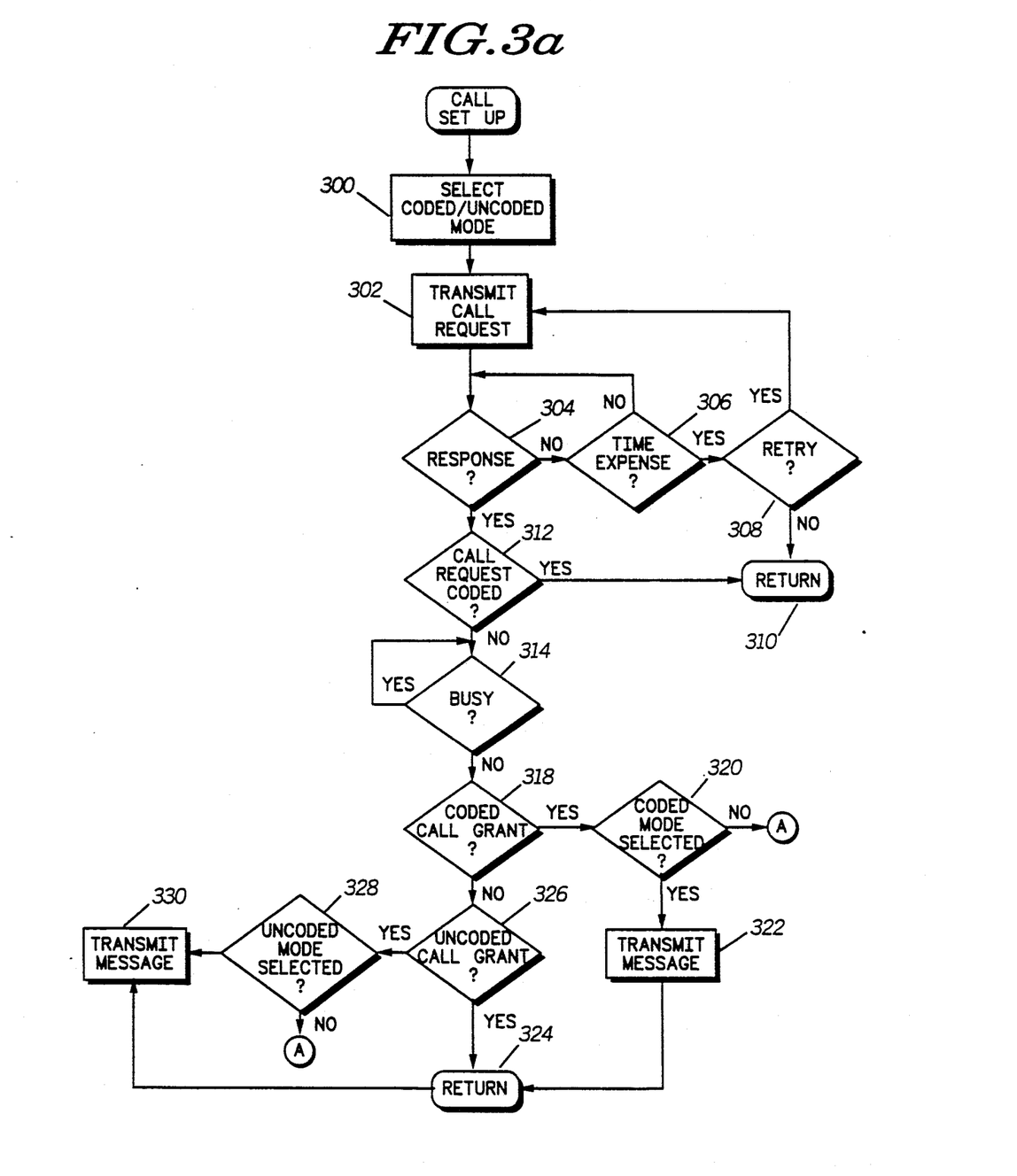
FIGS. 3a and 3b are a flow diagrams illustrating the steps executed by the subscriber unit of FIG. 2 to establish (set up) a call.

Referring now to FIG. 3a, a flow diagram is illustrated to provide the sequence of steps and decisions executed by the controller 232 of the subscriber unit 108 in accordance with the present invention. The routine begins in step 300, where the coded or uncoded mode is selected as the current operational mode by the subscriber. In step 302, a call request is transmitted by the subscriber in an attempt to gain access to the limited communication resources. The type of call requests transmitted (i.e., coded or uncoded) depends upon and corresponds to the current operational mode selected by the subscriber. Decision 304 determines whether a response has been received from the resource controller 104. If not, the subscriber determines whether a timer has expired (decision 306). The timer is preferably any suitable software routine, which determines how long the subscriber unit will await for a response from the resource controller 104. If the timer has not expired, the routine returns to decision 304 to await a response. However, if the timer has expired, the routine proceeds to decision 308, which determines whether the subscriber unit should automatically retry the call request on the assumption that the resource controller 104 did not receive the call request due to an adverse transmission phenomenon. An affirmative determination from decision 308 returns control to step 302 (where the call request is retransmitted). However, a decision not to retry exits the routine to return to other activities (step 310).

Assuming now that a response was received, decision 312 determines whether the call request has been denied. If so, the routine returns to other procedures (step 310). However, if a request denied code was not received, the routine proceeds to decision 314, which determines whether the communication resource controller has indicated that all of the communication resources are busy. If so, the subscriber unit will wait until the communication resource controller 104 has called back (responded) with a communication grant. According to the invention, the resource controller queues each call request denied due to busy communication resources, and calls back the requesting subscriber unit with a communication grant as the communication resources become available.

Assuming that a busy code was not received, the routine proceeds to decision 318, which determines whether a coded call grant was received. The transmission of a coded call (communication) grant by the communication resource controller indicates that each called subscriber unit is capable of operating in the coded operational mode. Accordingly, decision 320 determines whether the subscriber unit is actually in the coded operational mode. If the determination of decision 320 is that the current operational mode does not match the authorized transmission mode, the routine proceeds to reference letter A of FIG. 3b. However, if the modes correspond, the subscriber unit may transmit informational signals so as to participate in the communication. Conversely, if a coded grant was not received, decision 326 determines whether an uncoded call grant was received. If so, decision 328 determines whether the uncoded operational mode is the current operational mode of the subscriber unit. If not, the routine proceeds to reference letter A of FIG. 3b. However, correspondence of the operational mode enables the subscriber unit to participate in the communication (step 330).

Figure 3B:
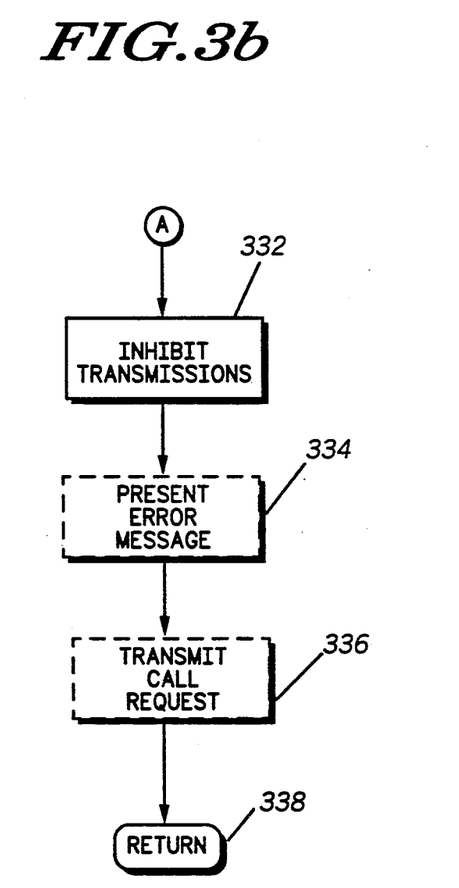

Referring to FIG. 3b, the subscriber unit begins by inhibiting transmissions in step 332 since the current operational mode did not correspond to the authorized transmission mode. By inhibiting transmissions, erroneous transmissions are prevented. Of course, the receiver section of the subscriber unit is automatically adapted to receive (monitor) the transmissions of other subscriber unit. Next, an error message may be presented to the operator to inform the subscriber as to why transmissions are being prohibited. Optionally, the subscriber unit may automatically transmit a new call request in the current operational mode (336). Else, the subscriber unit will return to other activities in step 338.

Figure 4:
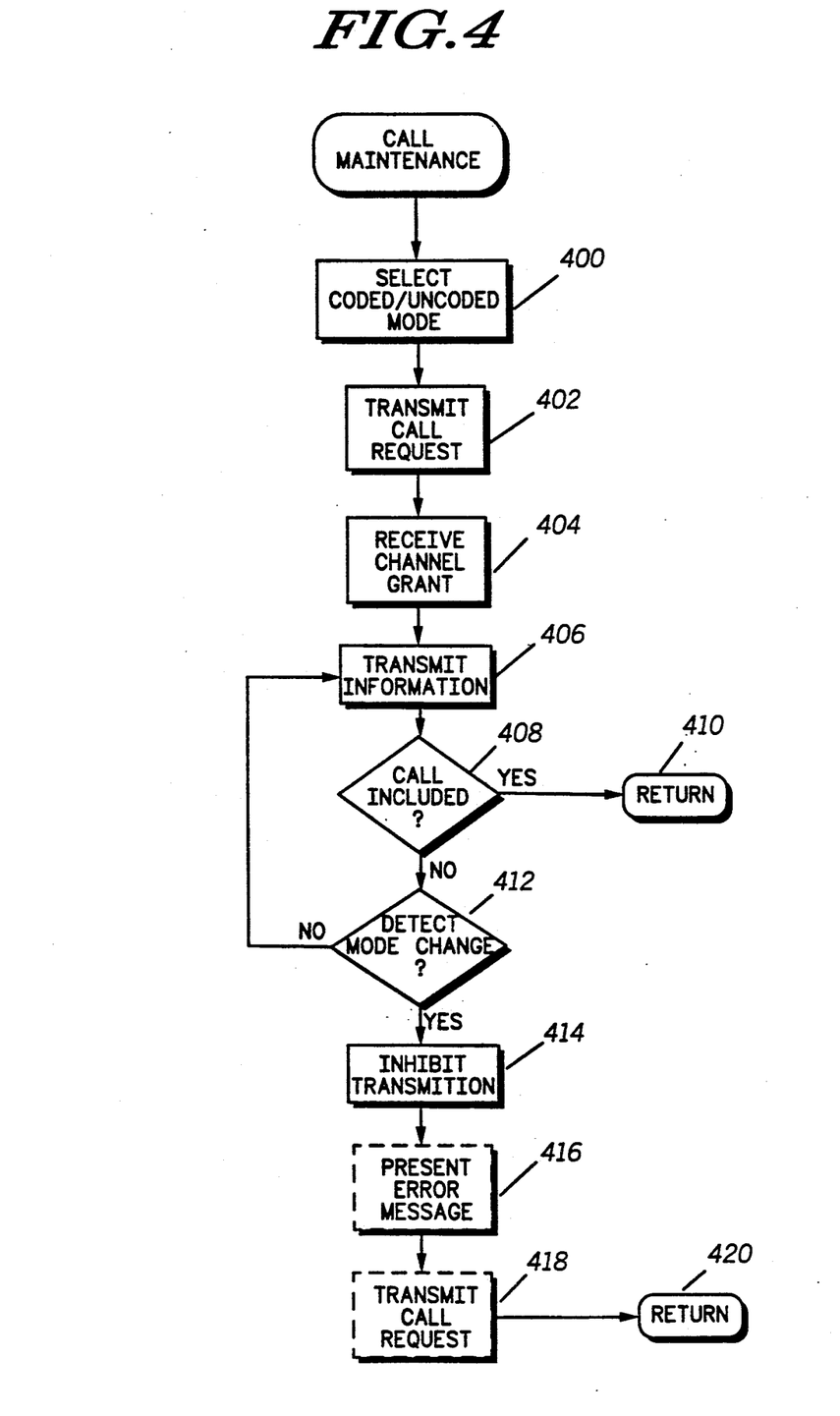
FIG. 4 is a flow diagrams illustrating the steps executed by the subscriber unit of FIG. 2 to maintain a call.

FIG. 4 illustrates the call maintenance routine executed by the subscriber units in accordance with the present invention. The routine begins in step 400 where the current operational mode is selected as either the coded and uncoded operational modes. In step 402, a call request is transmitted to the resource controller 104. Assuming that communication resources are available, the subscriber unit may receive a channel grant (step 404) and begin transmitting an information signal (step 406). According to the invention, while participating in the communication, the subscriber units determines whether the call has been concluded in decision 408. An affirmative determination returns activities to other functions (step 410). Assuming, however, that the call has not concluded, decision 412 determines whether the operational mode has been inadvertently (or deliberately) changed while participating in this conversation. If not, the routine proceeds back to step 406, where the information signal may be transmitted in accordance with the current operational mode. However, detection of a mode change in mid-conversation, causes the subscriber unit to automatically inhibit further transmissions (step 414). Following this, an error message may be presented to the operator (step 416) and optionally a call request may be transmitted (step 418) in the current operational mode in an attempt to reestablish communication.

Figure 5:
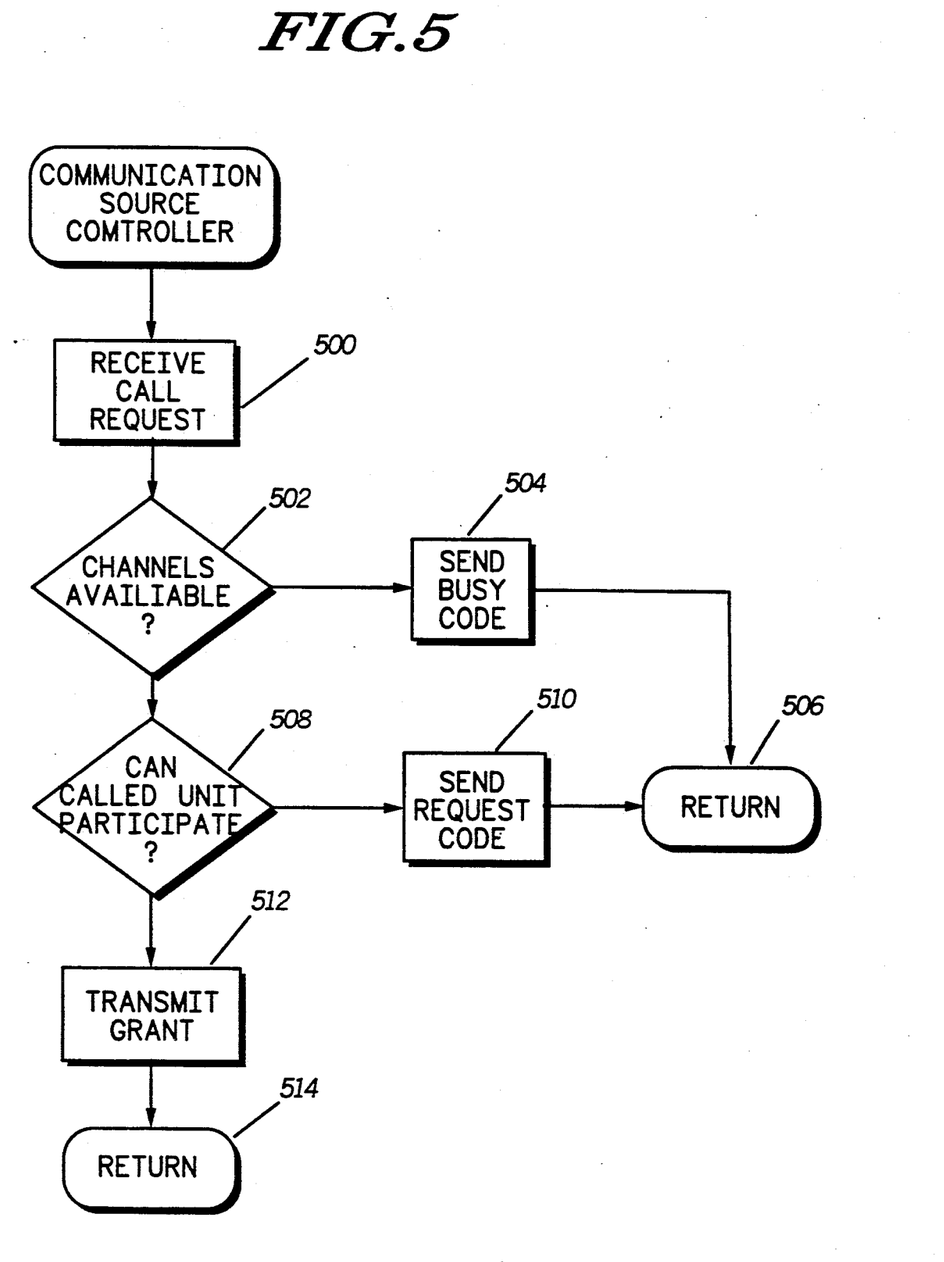
FIG. 5 is a flow diagram illustrating the steps executed by the communication resource controller of FIG. 1.

Referring to FIG. 5, the steps executed by the resource controller 104 shown. In step 500, a call request is received requesting access to the communication resources for either a coded or uncoded transmission. Decision 502 determines whether there are any resources available to permit such a communication. If not, a busy code is transmitted to the requesting subscriber unit (step 504) and the resource controller returns to other activities (step 506). However, if resources are available, the resource controller determines whether the called subscriber units are capable of participating in the requested communication (decision 508). To do this, the resource controller compares the requested transmission mode with the operational mode capabilities of the called subscriber units. Failure of the called subscriber units to have the capability to participate in the requested call (whether coded or uncoded) will cause the transmission of a rejection code (step 510). However, if the subscriber units are capable of participating, a communication grant code is transmitted (step 512), which authorizes transmission on a particular communication resource in a particular communication mode (i.e. coded or uncoded). Following this, the resource controller returns to other activities in decision 514.

What is claimed is:

1. In a radio capable of transmitting an information signal in an encrypted or unencrypted mode, a method for preventing unauthorized transmissions, comprising the steps of:

(a) selecting either the encrypted or unencrypted transmission mode as a current transmission mode;
   (b) receiving a message representing authorization for transmission of either the encrypted or unencrypted transmission mode to provide an authorized transmission mode; and
   (c) comparing at least the authorized transmission mode to the current transmission mode and enabling transmission when the authorized transmission mode corresponds to the current transmission mode.

2. The method of claim 1, which includes the step of (a1) transmitting a signal representing a request to transmit.

3. The method of claim 1, which includes the step of (a1) transmitting a signal representing a request to transmit in the current transmission mode.

4. The method of claim 1, which includes the step of (d) transmitting, automatically, a signal representing a request to transmit in the current transmission mode.

5. In a radio capable of transmitting an information signal in an encrypted or unencrypted mode, a method for preventing unauthorized transmissions, comprising the steps of:

(a) selecting either the encrypted or unencrypted transmission modes as a current transmission mode;
   (b) receiving a message representing authorization for transmission of either the encrypted or unencrypted uncoded transmission mode to provide an authorized transmission mode;
   (c) comparing at least the authorized transmission mode to the current transmission mode and enabling transmission when the authorized transmission mode corresponds to the current transmission mode; and (d) presenting a transmission prohibited signal when the authorized transmission mode does not correspond to the current transmission mode.

6. In a radio capable of transmitting an information signal in an encrypted or unencrypted mode, a method for preventing unauthorized transmissions, comprising the steps of:
   (a) selecting either an encrypted or an unencrypted transmission mode as a current transmission mode;
   (b) transmitting an information signal in accordance with the current transmission mode;
   (c) detecting a change in the current transmission mode; and
   (d) preventing further transmissions of the information signal.

7. The method of claim 6, which includes the step of (e) presenting a transmission prohibited signal when the authorized transmission mode does not correspond to the current transmission mode.

8. The method of claim 6, wherein step (c) comprises detecting the current transmission mode change from the encrypted to the unencrypted transmission mode during an encrypted communication.

9. The method of claim 6, wherein step (c) comprises detecting the current transmission mode change from the unencrypted to the encrypted transmission mode during unencrypted communication.

10. The method of claim 6, wherein step (d) comprises:
    (d1) transmitting, automatically, a signal representing a request to transmit in the current transmission mode;
    (d2) preventing further transmissions of the information signal until an authorization code is received.

11. In a radio capable of transmitting an information signal in an encrypted or unencrypted mode, a method for preventing unauthorized transmissions, comprising the steps of:
    (a) selecting either an encrypted or an unencrypted transmission mode as a current transmission mode;
    (b) transmitting a signal representing a request to transmit in the current transmission mode;
    (c) receiving a message representing authorization for transmission either the encrypted or unencrypted transmission mode to provide an authorized transmission mode;
    (d) comparing at least the authorized transmission mode to the current transmission mode and enabling transmission when the authorized transmission mode corresponds to the current transmission mode;
    (e) transmitting an information signal in accordance with the current transmission mode when transmission is enabled;
    (f) detecting a change in the current transmission mode; and
    (g) preventing further transmissions of the information signal.

12. In a communication system supporting both encrypted and unencrypted transmissions, a method for preventing unauthorized transmissions, comprising the steps of:
    at a communication initiating subscriber unit:
    (a) selecting either an encrypted or an unencrypted transmission mode as a current transmission mode;
    (b) transmitting an information signal representing a request to communicate with at least one other subscriber unit in the current transmission mode to a communication resource control unit;
    at the communication resource control unit:
    (a) receiving the information signal representing a request to communicate with at least one other subscriber unit in a requested transmission mode;
    (b) determining whether the at least one other subscriber unit is capable of transmitting in the requested transmission mode;
    (c) transmitting a message authorizing communication when the current transmission mode of each of the at least one other subscriber unit is capable of transmitting in the requested transmission mode.

13. The method of claim 12, which includes the central unit step of (d) transmitting a message denying communication when the current transmission mode of the at least one other subscriber units cannot transmit in the requested transmission mode.

14. The method of claim 12, which includes the communication initiating subscriber unit steps of:
    (c) receiving a message representing authorization for transmission of either the encrypted or unencrypted transmission mode to provide an authorized transmission mode; and
    (d) comparing at least the authorized transmission mode to the current transmission mode and enabling transmission when the authorized transmission mode corresponds to the current transmission mode.

15. The method of claim 14, which includes the communication initiating subscriber unit steps of:
    (e) transmitting an information signal in accordance with the current transmission mode;
    (f) detecting a change in the current transmission mode; and
    (g) preventing further transmissions of the information signal.

16. The method of claim 12, which includes the other subscriber unit steps of:
    (a) receiving a message representing authorization for transmission of either the encrypted or unencrypted transmission mode to provide an authorized transmission mode; and
    (b) comparing at least the authorized transmission mode to the current transmission mode and enabling transmission when the authorized transmission mode corresponds to the current transmission mode.

17. The method of claim 16, which includes the other subscriber unit steps of:
    (c) transmitting an information signal in accordance with the current transmission mode;
    (d) detecting a change in the current transmission mode; and
    (e) preventing further transmissions of the information signal.

18. In a communication system supporting both encrypted and unencrypted transmissions, a method for preventing unauthorized transmissions, comprising the steps of:
    at a communication initiating subscriber unit:
    (a) selecting either an encrypted or an unencrypted transmission mode as a current transmission mode;

(b) transmitting a signal representing a request to communicate with at least one other subscriber unit in the current transmission mode to a communication resource control unit;

at the communication resource control unit:
- (a) receiving the signal representing a request to communicate with at least one other subscriber units in a requested transmission mode;
- (b) determining whether the at least one other subscriber unit is capable of transmitting in the requested communication mode;
- (c) transmitting an encryption key to any of the at least one other subscriber unit not capable of transmitting in the requested transmission mode;
- (d) transmitting a message authorizing communication in the requested transmission mode to the communication initiating subscriber unit and each of the at least one other subscriber units.

19. A radio capable of transmitting an information signal in an encrypted or unencrypted mode, the radio including a means for preventing unauthorized transmissions, comprising
- means for selecting either an encrypted or an unencrypted transmission mode as a current transmission mode;
- means for receiving a message representing authorization for transmission either the encrypted or unencrypted transmission mode to provide an authorized transmission mode; and
- means for comparing at least the authorized transmission mode to the current transmission mode and enabling transmission when the authorized transmission mode corresponds to the current transmission mode.

20. A communication system capable of preventing unauthorized encrypted and unencrypted transmissions, comprising:

at a communication initiating subscriber unit:
- means for selecting either an encrypted or an unencrypted transmission mode as a current transmission mode;
- means for transmitting a signal representing a request to communicate with at least one other subscriber unit in the current transmission mode to a communication resource control unit;

at the communication resource control unit:
- means for receiving the signal representing a request to communicate with at least one other subscriber unit in a requested transmission mode;
- means for determining whether the at least one other subscriber unit is capable of transmitting in the requested communication mode;
- means for transmitting a code to any of the at least one other subscriber unit not capable of transmitting in the requested transmission mode;
- means for transmitting a message authorizing communication in the requested transmission mode to the communication initiating subscriber unit and each of the at least one other subscriber units.

* * * * *